United States Patent [19]
Barton

[11] Patent Number: 5,485,696
[45] Date of Patent: Jan. 23, 1996

[54] FISHING LURE RETRIEVAL APPARATUS

[76] Inventor: Denny R. Barton, 1619 E. Longview La., Mustang, Okla. 73064

[21] Appl. No.: 205,176
[22] Filed: Mar. 3, 1994
[51] Int. Cl.$^6$ ............................................. A01K 97/00
[52] U.S. Cl. ............................................. 43/17.2
[58] Field of Search ............................. 43/17.2

[56] References Cited

U.S. PATENT DOCUMENTS

| | | | |
|---|---|---|---|
| 2,676,430 | 4/1954 | Richard | 43/17.2 |
| 2,732,650 | 1/1956 | Passmore, Jr. et al. | 43/17.2 |
| 2,764,833 | 10/1956 | Clark | 43/17.2 |
| 2,801,489 | 8/1957 | Gehring | 43/17.2 |
| 2,807,905 | 10/1957 | Ford | 43/17.2 |
| 3,163,955 | 1/1965 | Lockwood | 43/17.2 |
| 3,246,415 | 4/1966 | Forbes | 43/17.2 |
| 3,688,429 | 9/1972 | Mauck | 43/17.2 |
| 3,693,277 | 9/1972 | Wells | 43/17.2 |
| 3,729,854 | 5/1973 | Satama | 43/17.2 |
| 3,987,573 | 10/1976 | Clayton | 43/17.2 |
| 4,885,863 | 12/1989 | Sprague | 43/17.2 |
| 4,930,244 | 6/1990 | Enwiller | 43/17.2 |
| 5,081,784 | 1/1992 | Santucci et al. | 43/17.2 |
| 5,157,856 | 10/1992 | Packer | 43/17.2 |

Primary Examiner—P. Austin Bradley
Assistant Examiner—Chuck Y. Mah

[57] ABSTRACT

An apparatus arranged to engage a fishing lure and, as required, a surrounding lure environment such that the lure may be freed from an underwater entanglement. The invention includes a hook member arranged for sliding engagement along a fishing line, with the hook member mounting a ring, and the ring mounting a plurality of radially extending links of chain cable, each chain cable terminating in a hook member.

4 Claims, 2 Drawing Sheets

FISHING LURE RETRIEVAL APPARATUS

BACKGROUND OF THE INVENTION

1. Field of the Invention

The field of invention relates to fishing lure retrieval structure, and more particularly pertains to a new fishing lure retrieval apparatus wherein the same is arranged to engage a fishing lure, a fishing hook, or surrounding environment to retrieve a fishing lure structure.

2. Description of the Prior Art

Lure retrieval structure is indicated in U.S. Pat. Nos. 4,885,863; 3,693,277; 5,157,856; and 4,930,244.

The instant invention attempts to overcome deficiencies of the prior art by providing for an organization arranged for ease of use as well as effectiveness in construction and in this respect, the present invention substantially fulfills this need.

SUMMARY OF THE INVENTION

In view of the disadvantages inherent in the known types of fishing lure retrieval apparatus now present in the prior art, the present invention provides a fishing lure retrieval apparatus wherein the same is arranged to slidably receive a fishing line therethrough to guide the retrieval apparatus to the fishing lure and subsequently retrieve the fishing lure.

To attain this, the present invention provides an apparatus arranged to engage a fishing lure and, as required, a surrounding lure environment such that the lure may be freed from an underwater entanglement. The invention includes a hook member arranged for sliding engagement along a fishing line, with the hook member mounting a ring, and the ring mounting a plurality of radially extending links of chain cable, each chain cable terminating in a hook member.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is an object of the present invention to provide a new fishing lure retrieval apparatus which may be easily and efficiently manufactured and marketed.

It is a further object of the present invention to provide a new fishing lure retrieval apparatus which is of a durable and reliable construction.

An even further object of the present invention is to provide a new fishing lure retrieval apparatus which is susceptible of a low cost of manufacture with regard to both materials and labor, and which accordingly is then susceptible of low prices of sale to the consuming public, thereby making such fishing lure retrieval apparatus economically available to the buying public.

Still yet another object of the present invention is to provide a new fishing lure retrieval apparatus which provides in the apparatuses and methods of the prior art some of the advantages thereof, while simultaneously overcoming some of the disadvantages normally associated therewith.

Even still yet another object of the present invention is to provide a new fishing lure retrieval apparatus which includes a hook member arranged for sliding engagement along a fishing line, with the hook member mounting a ring, and the ring mounting a plurality of radially extending links of chain cable, each chain cable terminating in a hook member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
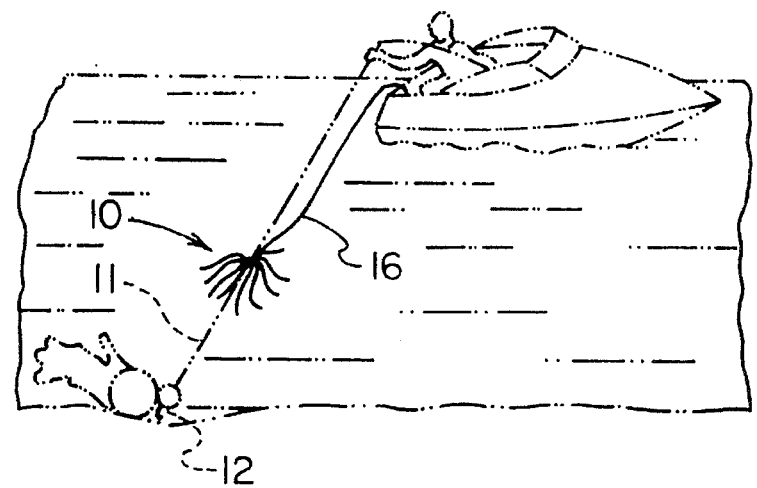
FIG. 1 is an orthographic view of the invention in use.

With reference now to the drawings, and in particular to FIGS. 1-4 thereof, a new fishing lure retrieval apparatus embodying the principles and concepts of the present invention and generally designated by the reference numeral 10 will be described.

Figure 2:
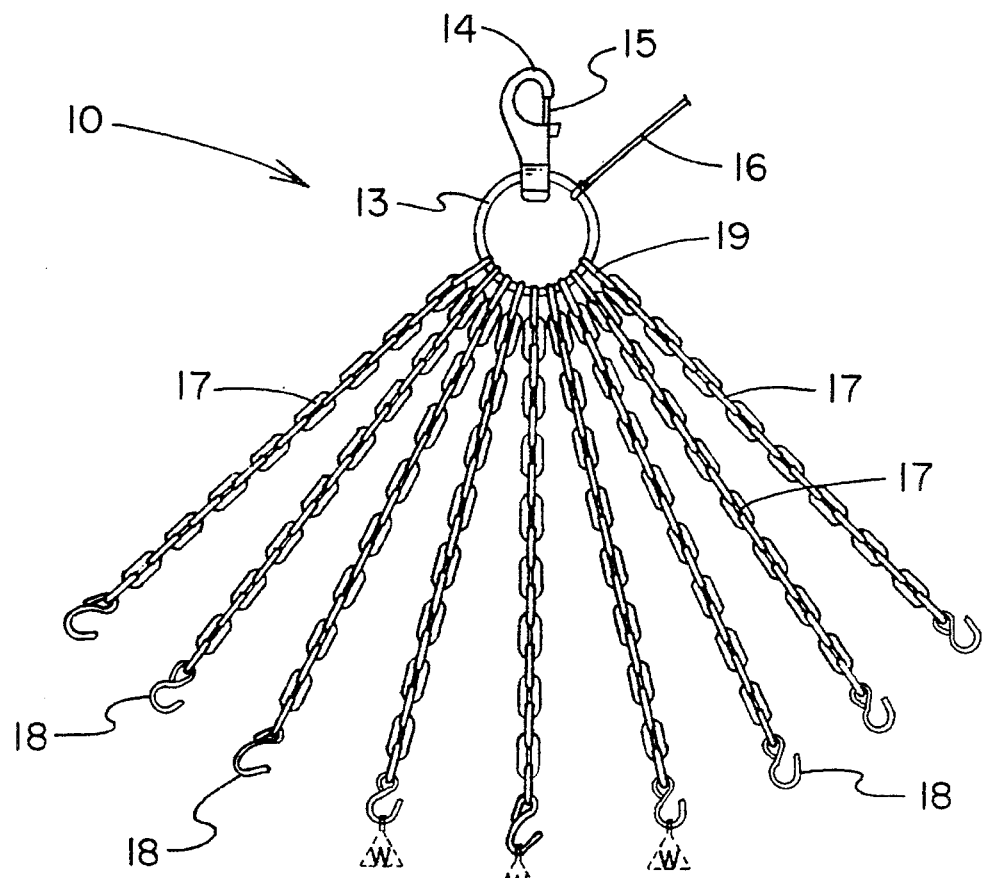
FIG. 2 is an orthographic view of the invention.
Figure 3:
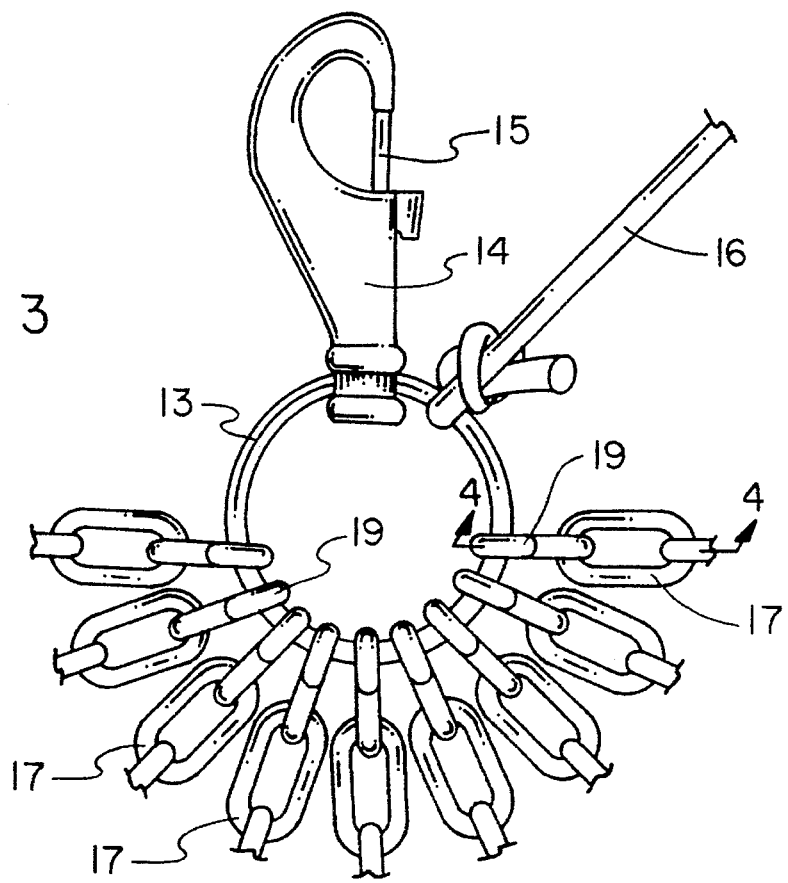
FIG. 3 is an enlarged orthographic view of the mounting ring and snap hook structure.

More specifically, the fishing lure retrieval apparatus 10 of the instant invention comprises a snap hook 14 arranged to receive a fishing line 11 therethrough, as illustrated in FIGS. 1 and 2, to guide the apparatus 10 along the fishing line to the fishing lure 12 secured to the distal end of the fishing line. The snap hook 14 includes a slide bar 15 arranged to permit opening of the snap hook to direct the fishing line 11 within the enclosed loop defined by the snap hook when the slide bar is in contiguous communication with the hook outermost end. A rigid ring 13 is slidably received through the snap hook 14 and, as illustrated in greater detail in FIG. 3, has a pull cable 16 of flexible construction mounted to the rigid ring to permit an individual to direct tension to the ring and retrieve the apparatus 10 from a subterranean environment, inasmuch as fishing line is typically not available to accommodate lifting such weight.

A plurality of links of chain cable 17 are coupled to the rigid ring 13 by a plurality of S-hooks 19 such that the chain cables originates and radially extends from the rigid ring 13 in a sliding relationship, with each of the chain cables 17 terminating in a hook member 18. The hook members 18 are arranged to engage the fishing lure 12, a fishing hook, and if required, the surrounding environment to retrieve the fishing lure to a boat or other structure such as a dock or beach. If so desired, weight members "W" may be mounted onto an individual or plurality of the hook members 18 to impart stability and ease of sinking of the device in use.

Figure 4:
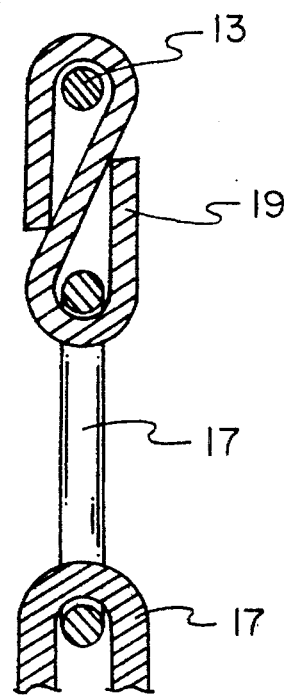
FIG. 4 is an orthographic view, taken along the lines 4-4 of FIG. 3 in the direction indicated by the arrows.

Referring now to FIG. 4, it can be shown that the S-hooks 19 each comprise an unlabeled first member having a center portion and a lower end spaced from an upper end. The lower end of the first member is bent back in a first direction to abuttingly engage the center portion so as to define a lower loop projecting through a first chain link of the first end of the respective chain cable 17. Similarly, the upper end of the first member is bent back in a second direction opposite to the first direction to abuttingly engage the center portion so as to define an upper loop projecting through the ring. Preferably, the loops and the center portion of the first member all reside within a common plane. Further, it is desirable for the upper end of the first member to project downwardly beyond the lower end of the first member.

As shown in FIG. 2, the hook members 18 each comprise an unlabeled second member having a center portion and lower end spaced from an upper end. The lower end of the second member is bent back in a first direction upon the center portion of the second member so as to define a lower loop. However, the lower end of the second member is spaced from the center portion thereof so as to define a hooking portion of the hook member 18. In contrast, the upper end of the second member is bent back in a second direction opposite to the first direction to abuttingly engage the center portion so as to define an upper loop projecting through a last chain link of the outer distal end of the respective chain cable 17 so as to couple the hook member 18 to the chain cable.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A fishing lure retrieval apparatus comprising:

a rigid ring;

a snap hook slidably mounted onto the rigid ring, the snap hook including a hook entrance opening, with a slide bar slidably directed across the entrance opening to provide for an enclosed loop within the snap hook;

a flexible pull cable mounted to the rigid ring and extending from the rigid ring;

a plurality of lengths of chain cable slidably mounted along the rigid ring, with each chain cable having a first end secured to the rigid ring in a sliding relationship, and each chain cable having an outer distal end, each chain cable being secured to the rigid ring by an S-hook interposed between the first end of the respective chain cable and the rigid ring, the S-hook comprising a first member having a center portion and a lower end spaced from an upper end, the lower end of the first member being bent back in a first direction to abuttingly engage the center portion so as to define a lower loop projecting through a first chain link of the first end of the respective chain cable, and the upper end of the first member being bent back in a second direction opposite to the first direction to abuttingly engage the center portion so as to define an upper loop projecting through the ring, with the loops and the center portion of the first member all residing within a common plane, and further wherein the upper end of the first member projects downwardly beyond the lower end of the first member;

and, a plurality of hook members, with an individual one of said hook members being coupled to an individual one of said lengths of chain cable at said outer distal end thereof, each of the hook members comprising a second member having a center portion and lower end spaced from an upper end, the lower end of the second member being bent back in a first direction upon the center portion of the second member so as to define a lower loop, the lower end of the second member being spaced from the center portion thereof, and the upper end of the second member being bent back in a second direction opposite to the first direction to abuttingly engage the center portion so as to define an upper loop projecting through a last chain link of the outer distal end of the respective chain cable, with the loops and the center portion of the second member all residing within a common plane.

2. An apparatus as set forth in claim 1, and further including a weight member mounted onto an individual one of the hook members, wherein the lower loop projects through a portion of the weight member so as to removably couple the weight member to the hook member.

3. An apparatus as set forth in claim 2, wherein said plurality of lengths of chain cable comprises nine lengths of chain cable slidably mounted along the rigid ring, with each chain cable having a first end secured to the rigid ring in a sliding relationship, and each chain cable having an outer distal end; and, said plurality of hook members comprises nine hook members, with an individual one of said hook members being to an individual one of said nine lengths of chain cable at said outer distal end thereof.

4. A fishing lure retrieval apparatus comprising:

a rigid ring;

a snap hook slidably mounted onto the rigid ring, the snap hook including a hook entrance opening, with a slide bar slidably directed across the entrance opening to provide for an enclosed loop within the snap hook;

a flexible pull cable mounted to the rigid ring and extending from the rigid ring;

a plurality of lengths of chain cable slidably mounted along the rigid ring, with each chain cable having a first end secured to the rigid ring in a sliding relationship, and each chain cable having an outer distal end;

a plurality of hook members, with an individual one of said hook members being coupled to an individual one of said lengths of chain cable at said outer distal end thereof, each of the hook members comprising a member having a center portion and lower end spaced from an upper end, the lower end of the member being bent back in a first direction upon the center portion of the member so as to define a lower loop, the lower end of the member being spaced from the center portion thereof to define a hook portion of the hook member, and the upper end of the member being bent back in a second direction opposite to the first direction to abuttingly engage the center portion so as to define an upper loop projecting through a last chain link of the outer distal end of the respective chain cable, with the loops and the center portion of the member all residing within a common plane;

and, a weight member mounted onto an individual one of the hook members, wherein the hook portion of the lower loop of the hook member projects through a portion of the weight member so as to removably couple the weight member to the hook member.

* * * * *